(12) United States Patent
Lin et al.

(10) Patent No.: US 11,303,042 B2
(45) Date of Patent: Apr. 12, 2022

(54) COMMUNICATION DEVICE

(71) Applicant: HTC Corporation, Taoyuan (TW)

(72) Inventors: Cheng-Hung Lin, Taoyuan (TW); Szu-Po Wang, Taoyuan (TW); Chun-Chieh Wang, Taoyuan (TW); Yu-Yu Chen, Taoyuan (TW); Shih-Hua Wu, Taoyuan (TW); Dun-Yuan Cheng, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 164 days.

(21) Appl. No.: 16/860,833

(22) Filed: Apr. 28, 2020

(65) Prior Publication Data

US 2020/0373680 A1 Nov. 26, 2020

Related U.S. Application Data (60) Provisional application No. 62/851,674, filed on May 23, 2019.

(51) Int. Cl.
| | |
|---|---|
| *H01Q 21/24* | (2006.01) |
| *H01Q 3/26* | (2006.01) |
| *H01Q 21/28* | (2006.01) |
| *H04B 7/06* | (2006.01) |
| *H04B 7/10* | (2017.01) |

(52) U.S. Cl.
CPC ............ *H01Q 21/245* (2013.01); *H01Q 3/26* (2013.01); *H01Q 21/28* (2013.01); *H04B 7/063* (2013.01); *H04B 7/10* (2013.01)

(58) Field of Classification Search
CPC ......... H01Q 21/245; H01Q 3/26; H01Q 21/28
See application file for complete search history.

(56) References Cited

U.S. PATENT DOCUMENTS

| | | | |
|---|---|---|---|
| 2012/0009884 A1 | 1/2012 | Rao et al. | |
| 2012/0182190 A1* | 7/2012 | Yui | H01Q 1/04 343/702 |
| 2018/0151947 A1 | 5/2018 | Apostolos et al. | |
| 2018/0205146 A1 | 7/2018 | Huang | |

FOREIGN PATENT DOCUMENTS

| | | |
|---|---|---|
| CN | 109256613 A | 1/2019 |
| EP | 3 742 548 A1 | 11/2020 |
| TW | 201807881 A | 3/2018 |
| WO | WO 2018/168139 A1 | 9/2018 |

OTHER PUBLICATIONS

European Search Report dated Oct. 15, 2020 in corresponding European Application No. 20175988.
European Office Action for European Application No. 20175988.3, dated Aug. 4, 2021.
European Notice of Allowance for European Application No. 20 175 988.3, dated Dec. 14, 2021.

* cited by examiner

*Primary Examiner* — Graham P Smith
(74) *Attorney, Agent, or Firm* — Birch, Stewart, Kolasch & Birch, LLP (57) ABSTRACT

A communication device includes a display device, a first antenna element, a second antenna element, a third antenna element, and a fourth antenna element. The display device is surrounded by the first antenna element, the second antenna element, the third antenna element, and the fourth antenna element. Any adjacent two of the first antenna element, the second antenna element, the third antenna element, and the fourth antenna element have different polarization directions.

19 Claims, 6 Drawing Sheets

COMMUNICATION DEVICE

CROSS REFERENCE TO RELATED APPLICATIONS

This application claims the benefit of U.S. Provisional Application No. 62/851,674, filed on May 23, 2019, the entirety of which is incorporated by reference herein.

BACKGROUND OF THE INVENTION

Field of the Invention

The disclosure generally relates to a communication device, and more particularly, to a communication device with multiple polarization directions.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

Wireless access points are indispensable elements that allow mobile devices in a room to connect to the Internet at high speeds. However, since indoor environments have serious problems with signal reflection and multipath fading, wireless access points should process signals from a variety of transmission directions simultaneously. Accordingly, it has become a critical challenge for current designers to design a high-isolation communication device with multiple polarization directions in the limited space of a wireless access point.

BRIEF SUMMARY OF THE INVENTION

In a preferred embodiment, the invention proposes a communication device that includes a display device, a first antenna element, a second antenna element, a third antenna element, and a fourth antenna element. The display device is surrounded by the first antenna element, the second antenna element, the third antenna element, and the fourth antenna element. Any adjacent two of the first antenna element, the second antenna element, the third antenna element, and the fourth antenna element have different polarization directions.

In some embodiments, a combination of the first antenna element, the second antenna element, the third antenna element, and the fourth antenna element substantially has a first closed-loop shape.

In some embodiments, the communication device further includes a housing. The display device is embedded in the housing.

In some embodiments, the housing is made of a nonconductive material.

In some embodiments, the first antenna element, the second antenna element, the third antenna element, and the fourth antenna element adhere to the housing.

In some embodiments, the first antenna element is adjacent to a right side of the housing, the second antenna element is adjacent to a bottom side of housing, the third antenna element is adjacent to a left side of the housing, and the fourth antenna element is adjacent to a top side of the housing.

In some embodiments, the first antenna element, the second antenna element, the third antenna element, and the fourth antenna element are linearly-polarized.

In some embodiments, a first polarization direction of the first antenna element is substantially $\vec{z}$, a second polarization direction of the second antenna element is substantially $\vec{y}$, a third polarization direction of the third antenna element is substantially $-\vec{z}$, and a fourth polarization polarization direction of the fourth antenna element is substantially $-\vec{y}$.

In some embodiments, the first polarization direction of the first antenna element are linearly-polarized, and the second antenna element and the fourth antenna element are circularly-polarized.

In some embodiments, a fist polarization direction of the first antenna element is substantially $\vec{z}$, a second polarization direction of the second antenna element is substantially RHCP (Right Hand Circular Polarization), a third polarization direction of the third antenna element is substantially $-\vec{z}$, and a fourth polarization direction of the fourth antenna element is substantially LHCP (Left Hand Circular Polarization).

In some embodiments, the first antenna element and the third antenna element are circularly-polarized, and the second antenna element and the fourth antenna element are linearly-polarized.

In some embodiments, a first polarization direction of the first antenna element is substantially RHCP, a second polarization direction of the second antenna element is substantially $\vec{y}$, a third polarization direction of the third antenna element is substantially LHCP, and a fourth polarization direction of the fourth antenna element is substantially $-\vec{y}$.

In some embodiments, the communication device further includes a fifth antenna element, a sixth antenna element, a seventh antenna element, and an eighth antenna element. The display device is surrounded by the first antenna element, the second antenna element, the third antenna element, the fourth antenna element, the fifth antenna element, the sixth as antenna element, the seventh antenna element, and the eighth antenna element. Any adjacent two of the first antenna element, the second antenna element, the third antenna element, the fourth antenna element, the fifth antenna element, the sixth antenna element, the seventh antenna element, and the eighth antenna element have different polarization directions.

In some embodiments, a combination of the first antenna element, the second antenna element, the third antenna element, the fourth antenna element, the fifth antenna element, the sixth antenna element, the seventh antenna element, and the eighth antenna element substantially has a second closed-loop shape.

In some embodiments, the fifth antenna element, the sixth antenna element, the seventh antenna element, and the eighth antenna element adhere to the housing.

In some embodiments, the fifth antenna element is adjacent to a bottom right corner of the housing, the sixth antenna element is adjacent to a bottom left corner of housing, the seventh antenna element is adjacent to a top left corner of the housing, and the eighth antenna element is adjacent to a top right corner of the housing.

In some embodiments, the first antenna element, the second antenna element, the third antenna element, the fourth antenna element, the fifth antenna element, the sixth antenna element, the seventh antenna element, and the eighth antenna element are linearly-polarized.

In some embodiments, a first polarization direction of the first antenna element is substantially $\vec{z}$, a second polarization direction of the second antenna element is substantially $\vec{y}$, a third polarization direction of the third antenna element is substantially $-\vec{z}$, and a fourth polarization direction of the fourth antenna element is substantially $-\vec{y}$, a fifth polarization direction of the fifth antenna element is substantially $-\vec{y}-\vec{z}$, a sixth polarization direction of the sixth antenna element is substantially $-\vec{y}+\vec{z}$, a seventh polarization direction of the seventh antenna element is substantially $\vec{y}+\vec{z}$, and an eighth polarization direction of the eighth antenna element is substantially $\vec{y}-\vec{z}$.

In some embodiments, the first antenna element, the second antenna element, the third antenna element, the fourth antenna element, the seventh antenna element, and the eighth antenna element are linearly-polarized, and the fifth antenna element and the sixth antenna element are circularly-polarized.

In some embodiments, a first polarization direction of the first antenna element is substantially $\vec{z}$, a second polarization direction of the second antenna element is substantially $\vec{y}$, a third polarization direction of the third antenna element is substantially $-\vec{z}$, and a fourth polarization direction of the fourth antenna element is substantially $-\vec{y}$, a fifth polarization direction of the fifth antenna element is substantially RHCP, a sixth polarization direction of the sixth antenna element is substantially LHCP, a seventh polarization direction of the seventh antenna element is substantially $\vec{y}+\vec{z}$, and an eighth polarization direction of the eighth antenna element is substantially $\vec{y}-\vec{z}$.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein ay likewise be interpreted accordingly.

Figure 1:
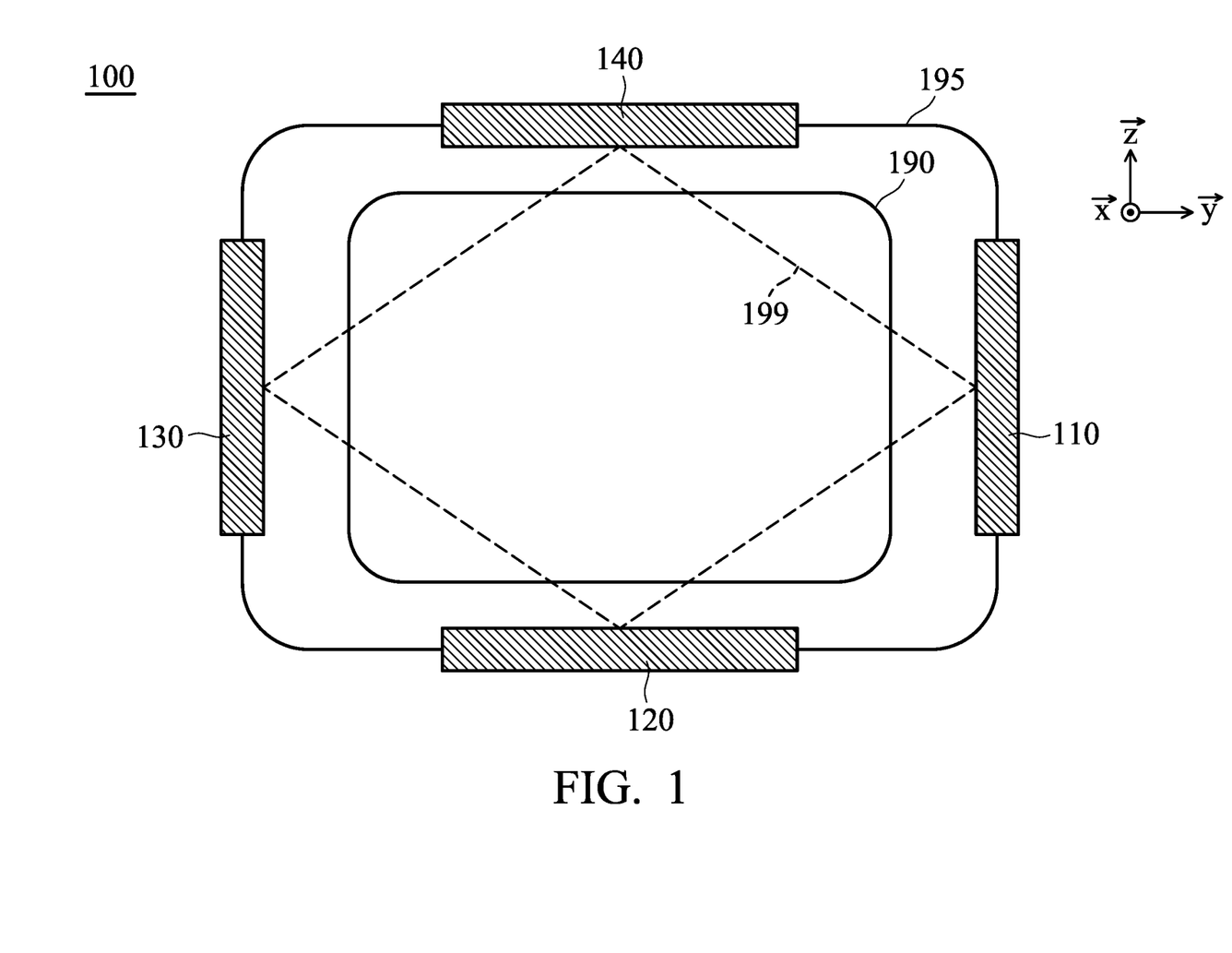
FIG. 1 is a front view of a communication device according to an embodiment of the invention.
Figure 2:
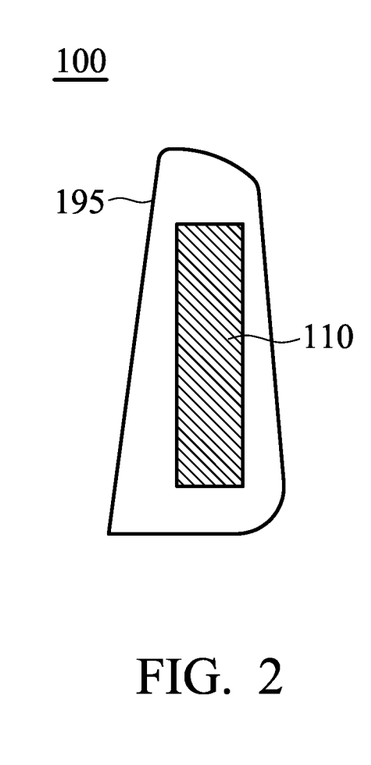
FIG. 2 is a right view of a communication device according to an embodiment of the invention.
Figure 3:
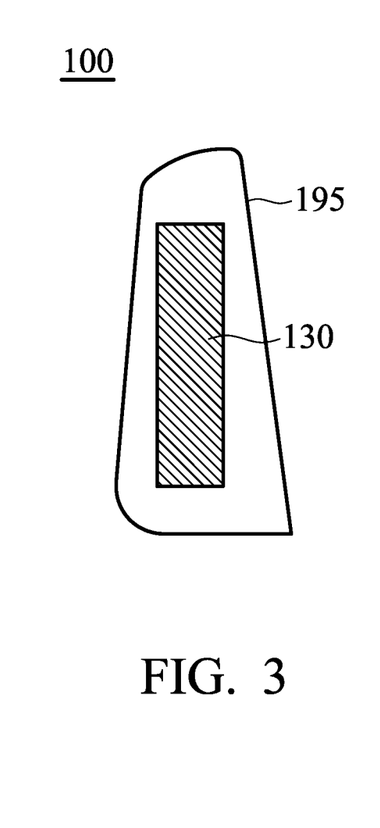
FIG. 3 is a left view of a communication device according to an embodiment of the invention.
Figure 4:
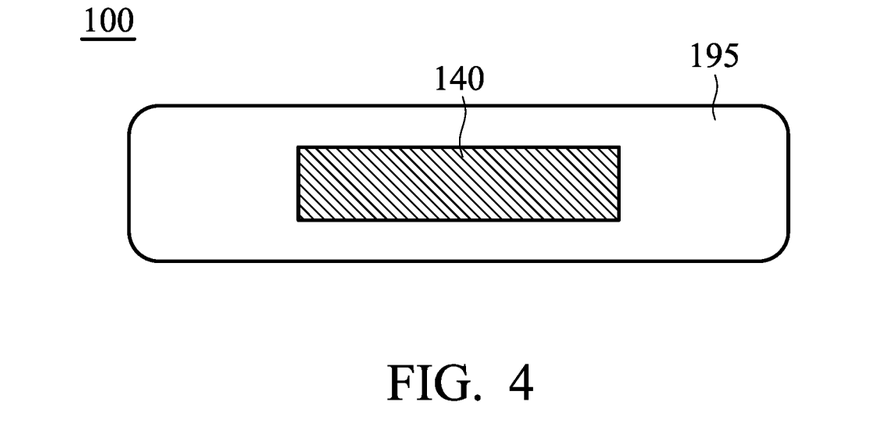
FIG. 4 is a top view of a communication deice according to air embodiment of the invention.
Figure 5:
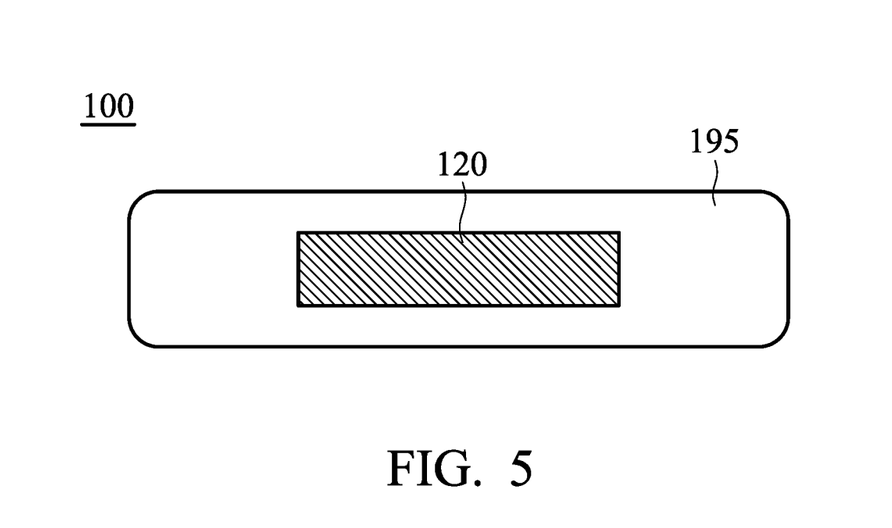
FIG. 5 is a bottom view of a communication device according to an embodiment of the invention.

FIG. 1 is a front view of a communication device 100 according to an embodiment of the invention. FIG. 2 is a right view of the communication device 100 according to an embodiment of the invention. FIG. 3 is a left view of the communication device 100 according to an embodiment of the invention. FIG. 4 is a top view of the communication device 100 according to an embodiment of the invention. FIG. 5 is a bottom view of the communication device 100 according to an embodiment of the invention. Please refer to FIGS. 1-5 together. For example, the communication device 100 limy be implemented with a wireless access point, but it is not limited thereto. As shown in FIGS. 1-5, the communication device 100 at least includes a first antenna element 110, a second antenna element 120, a third antenna element 130, a fourth antenna element 140, and a display device 190. It should be understood that the communication device 100 may further include other components, such as a speaker, a touch control module, and/or a power supply module, although they are not displayed in FIGS. 1-5.

The shapes and types of the first antenna element 110, the second antenna element 120, the third antenna element 130, and the fourth antenna element 140 are not limited in the invention. For example, any of the first antenna element 110, the second antenna element 120, the third antenna element 130, and the fourth antenna element 140 may be a monopole antenna, a dipole antenna, a loop antenna, a patch monopole, a helical antenna, a PIFA (Planar Inverted F Antenna), or a chip antenna. Furthermore, the first antenna element 110, the second antenna element 120, the third antenna element 130, and the fourth antenna element 140 can cover and/or operate in the same frequency band, for example, from 300 MHz to 10 GHz.

The display device 190 is surrounded by the first antenna element 110, the second antenna element 120, the third antenna element 130, and the fourth antenna element 140. In some embodiments, a combination of the first antenna element 110, the second antenna element 120, the third antenna element 130, and the fourth antenna element 140 substantially has a first closed-loop shape 199. For example, the first closed-loop shape 199 may be substantially a diamond shape, a rectangular shape, or a square shape, but it is not limited thereto.

In some embodiments, the communication device 100 further includes a housing 195, which is made of a nonconductive material. The display device 190 may be embedded in the center of the housing 195. The first antenna element 110, the second antenna element 120, the third antenna element 130, and the fourth antenna element 140 may all adhere to the housing 195. For example, the first antenna element 110, the second antenna element 120, the third antenna element 130, and the fourth antenna element 140 may all be disposed inside the housing 195. Alternatively, the first antenna element 110, the second antenna element 120, the third antenna element 130, and the fourth antenna element 140 may all be disposed outside the housing 195. The two designs can provide similar performance.

In some embodiments, the first antenna element 110 is adjacent to the right side of the housing 195, the second antenna element 120 is adjacent to the bottom side of housing 195, the third antenna element 130 is adjacent to the left side of the housing 195, and the fourth antenna element 140 is adjacent to the top side of the housing 195. It should be noted that the term "adjacent" or "close" over the disclosure means that the distance (spacing) between two corresponding elements is smaller than a predetermined distance (e.g., 5 mm or shorter), or means that the two corresponding elements directly touch each other (i.e., the aforementioned distance/spacing therebetween is reduced to 0).

In some embodiments, the first antenna element 110, the second antenna element 120, the third antenna element 130, and the fourth antenna element 140 are all linearly-polarized. Specifically, a first polarization direction of the first antenna element 110 may be substantially $\vec{z}$, a second polarization direction of the second antenna element 120 may be substantially $\vec{y}$, a third polarization direction of the third antenna element 130 may be substantially $-\vec{z}$, and a fourth polarization direction of the fourth antenna element 140 may be substantially $-\vec{y}$. Thus, any two adjacent antenna elements have orthogonal polarization directions, and the interference between them is suppressed.

In some embodiments, the first antenna element 110 and the third antenna element 130 are both linearly-polarized, and the second antenna element 120 and the fourth antenna element 140 are both circularly-polarized. Specifically, a first polarization direction of the first antenna element 110 may be substantially $\vec{z}$, a second polarization direction of the second antenna element 120 may be substantially RHCP (Right Hand Circular Polarization) (e.g., $\vec{y} - j \cdot \vec{z}$, where "j" represents an imaginary number, and the corresponding signal may be transmitted in the direction of $\vec{x}$), a third polarization direction of the third antenna element 130 may be substantially $-\vec{z}$, and a fourth polarization direction of the fourth antenna element 140 may be substantially LHCP (Left Hand Circular Polarization) (e.g., $\vec{y} + j \cdot \vec{z}$, where "j" represents an imaginary number, and the corresponding signal may be transmitted in the direction of $\vec{x}$). Thus, any two adjacent antenna elements have different types of polarizations, and the interference between them is suppressed.

In some embodiments, the first antenna element 110 and the third antenna element 130 are both circularly-polarized, and the second antenna element 120 and the fourth antenna element 140 are both linearly-polarized. Specifically, a first polarization direction of the first antenna element 110 may be substantially RHCP (e.g., $\vec{y} - j \cdot \vec{z}$), a second polarization direction of the second antenna element 120 may be substantially $\vec{y}$; a third polarization direction of the third antenna element 130 may be substantially LHCP (e.g., $\vec{y} + j \cdot \vec{z}$), and a fourth polarization direction of the fourth antenna element 140 may be substantially $-\vec{y}$. Thus, any two adjacent antenna elements have different types of polarizations, and the interference between them is suppressed.

Generally, any adjacent two of the first antenna element 110, the second antenna element 120, the third antenna element 130, and the fourth antenna element 140 have different polarization directions. According to practical measurements, such a design can effectively enhance the isolation between antenna elements, thereby significantly improving the communication quality of the communication device 100. It should be understood that the aforementioned directions of x-axis, y-axis and z-axis are used to describe the relative relationship between the respective antenna elements- An antenna designer can freely select any direction as the aforementioned x-axis, y-axis or z-axis (it may be reversed), without affecting the performance of the invention.

Figure 6:
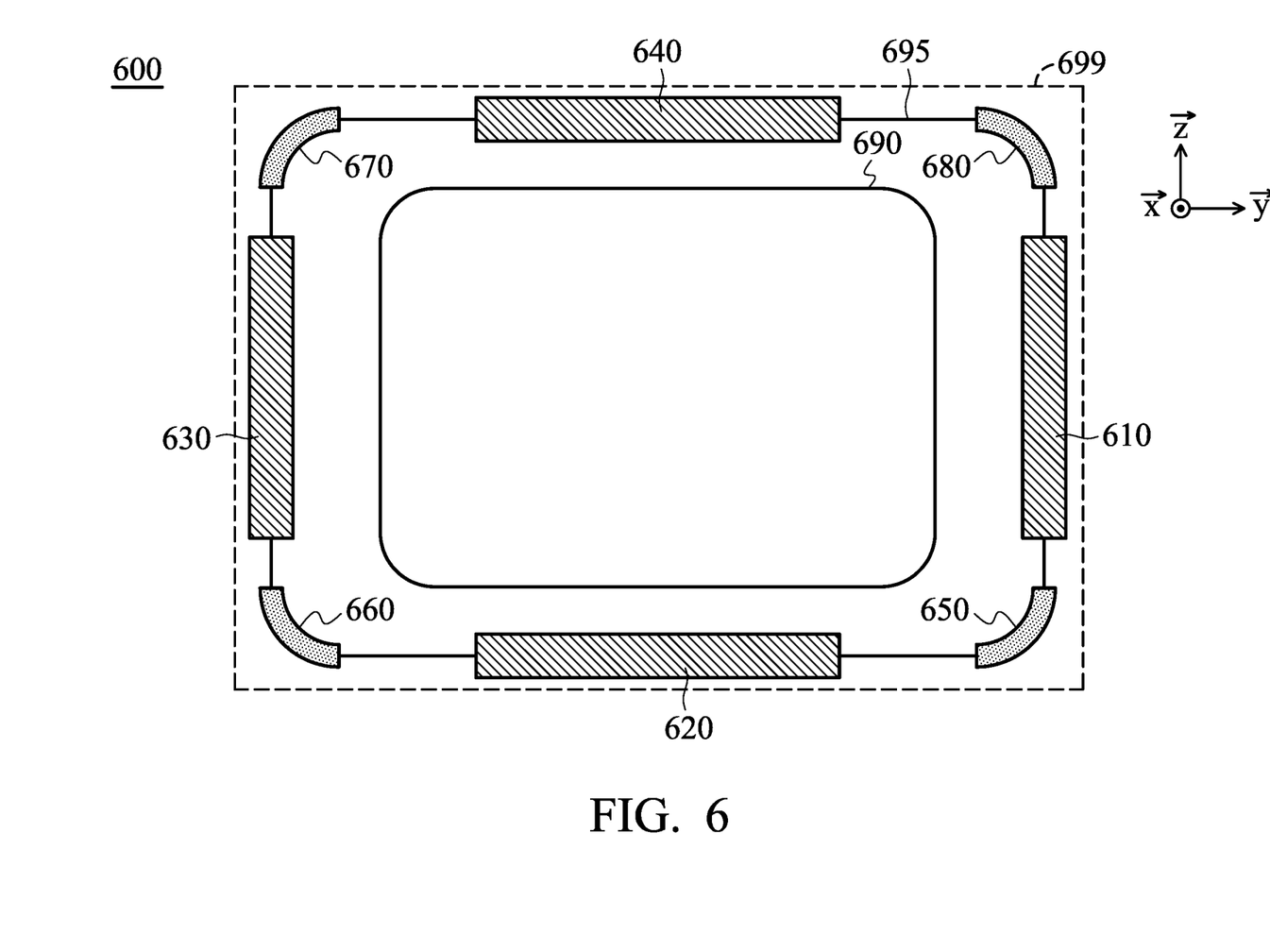
FIG. 6 is a front view of a communication device according to an embodiment of the invention.
Figure 7:
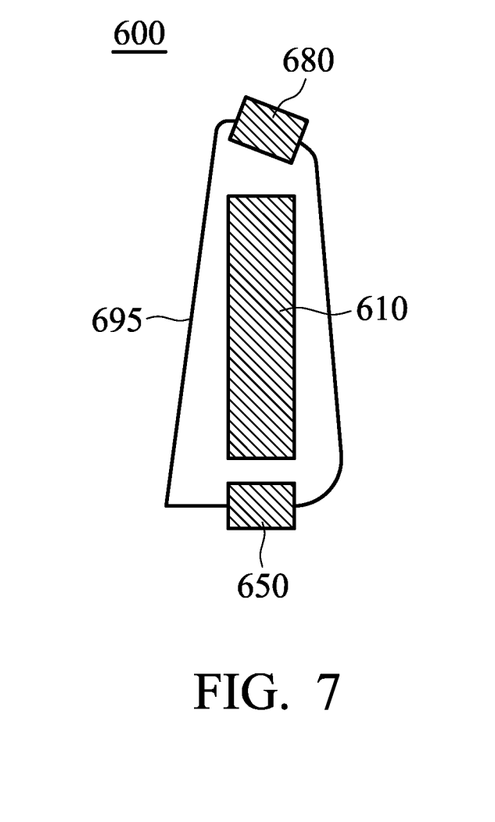
FIG. 7 is a right view of a communication device according to an embodiment of the invention.
Figure 8:
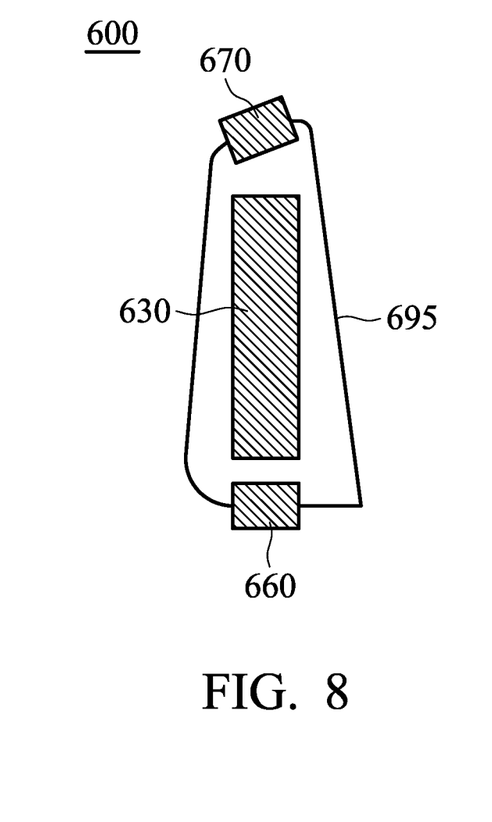
FIG. 8 is a left view of a communication device accord ins to an embodiment of the invention.
Figure 9:
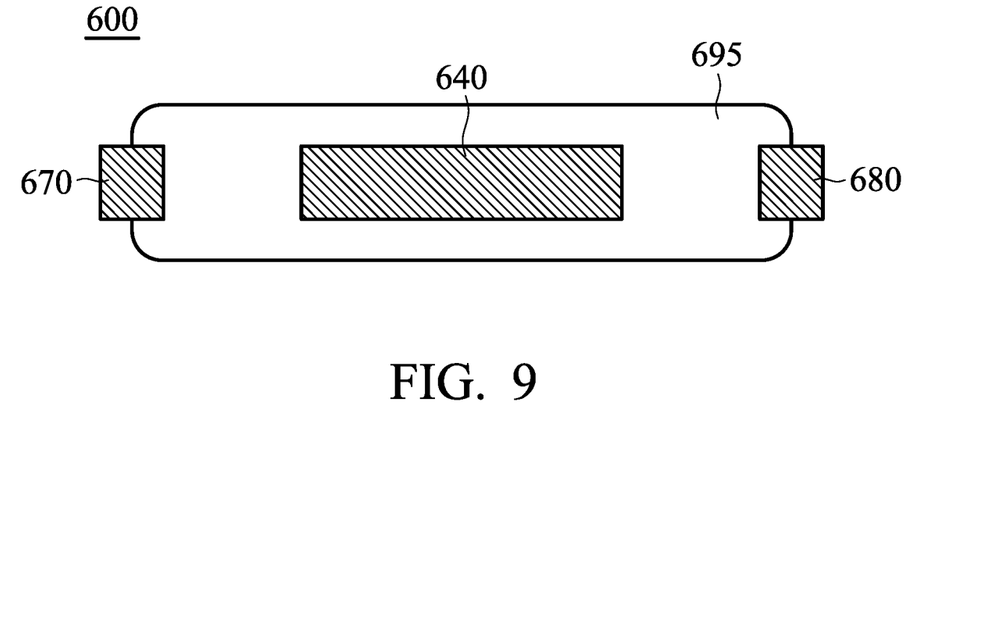
FIG. 9 is a top view of a communication device according to an embodiment of the invention.
Figure 10:
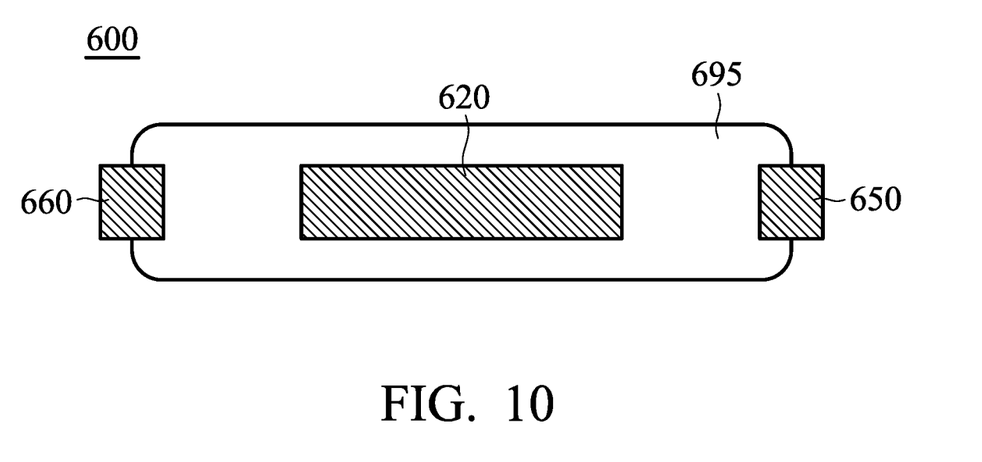
FIG. 10 is a bottom view of a communication device according to an embodiment of the invention.

FIG. 6 is a front view of a communication device 600 according to an embodiment of the invention. FIG. 7 is a right view of the communication device 600 according to an embodiment of the invention. FIG. 8 is a left view of the communication device 600 according to an embodiment of the invention. FIG. 9 is a top view of the communication device 600 according to an embodiment of the invention. FIG. 10 is a bottom view of the communication device 600 according to an embodiment of the invention. Please refer to FIGS. 6-10 together. As shown in FIGS. 6-10, the communication device 600 includes a first antenna element 610, a second antenna element 620, a third antenna element 630, a fourth antenna element 640, a fifth antenna element 650, a sixth antenna element 660, a seventh antenna element 670, an eighth antenna element 680, and a display device 690. Specifically, the fifth antenna element 650, the sixth antenna element 660, the seventh antenna element 670, and the eighth antenna element 680 are interleaved with the first antenna element 610, the second antenna element 620, the third antenna element 630, and the fourth antenna element 640.

The shapes and types of the first antenna element 610, the second antenna element 620, the third antenna element 630, the fourth antenna element 640, the fifth antenna element 650, the sixth antenna element 660, the seventh antenna element 670, and the eighth antenna element 680 are not limited in the invention. For example, any of the first antenna element 610, the second antenna element 620, the third antenna element 630, the fourth antenna dement 640, the fifth antenna element 650, the sixth antenna element 660, the seventh antenna element 670, and the eighth antenna element 680 may be a monopole antenna, a dipole antenna, a loop antenna a patch antenna, a helical antenna, a PIFA, or a chip antenna. Furthermore, the first antenna element 610, the second antenna element 620, the third antenna element 630, the fourth antenna element 640, the fifth antenna element 650, the sixth antenna element 660, the seventh antenna element 670, and the eighth antenna element 680 can cover and/or operate in the same frequency band, for example, from 300 MHz to 10 GHz.

The display device 690 is surrounded by the first antenna element 610, the second antenna element 620, the third antenna element 630, the fourth antenna element 640, the fifth antenna element 650, the sixth antenna element 660, the seventh antenna element 670, and the eighth antenna element 680. In some embodiments, a combination of the first antenna element 610, the second antenna element 620, the third antenna element 630, the fourth antenna element 640, the fifth antenna element 650, the sixth antenna element 660, the seventh antenna element 670, and the eighth antenna element 680 substantially has a second closed-loop shape 699. For example, the second closed-loop shape 699 may be substantially a rectangular shape, a square shape, or a parallelogram, but it is not limited thereto.

In some embodiments, the communication device 600 further includes a housing 695, which is made of a nonconductive material. The display device 690 may be embedded in the center of the housing 695. The first antenna element 610, the second antenna element 620, the third antenna element 630, the fourth antenna element 640, the fifth antenna element 650, the sixth antenna element 660, the seventh antenna element 670, and the eighth antenna element 680 may all adhere to the housing 695. For example, the first antenna element 610, the second antenna element 620, the third antenna element 630, the fourth antenna element 640, the fifth antenna element 650, the sixth antenna element 660, the seventh antenna element 670, and the eighth antenna element 680 may all be disposed inside the housing 695. Alternatively the first antenna element 610, the second antenna element 620, the third antenna element 630, the fourth antenna element 640, the fifth antenna element 650, the sixth antenna element 660, the seventh antenna element 670, and the eighth antenna element 680 may all be disposed outside the housing 695. The two designs can provide similar performance.

In some embodiments, the first antenna element 610 is adjacent to the right side of the housing 695, the second antenna element 620 is adjacent to the bottom side of housing 695, the third antenna element 630 is adjacent to the left side of the housing 695, the fourth antenna element 640 is adjacent to the top side of the housing 695, the fifth antenna element 650 is adjacent to the bottom right corner of the housing 695, the sixth antenna element 660 is adjacent to the bottom left corner of housing 695, the seventh antenna element 670 is adjacent to the top left corner of the housing 695, and the eighth antenna element 680 is adjacent to the top right corner of the housing 695.

In some embodiments, the first antenna element 610, the second antenna element 620, the third antenna element 630, the fourth antenna element 640, the fifth antenna element 550, the sixth antenna element 660, the seventh antenna element 670, and the eighth antenna element 680 are all linearly-polarized. Specifically, a first polarization direction of the first antenna element 610 may be substantially $\vec{z}$, a second polarization direction of the second antenna element 620 may be substantially $\vec{y}$, a third polarization direction of the third antenna element 630 may be substantially $-\vec{z}$, and a fourth polarization direction of the fourth antenna element 640 may be substantially $-\vec{y}$, a fifth polarization direction of the fifth antenna element 650 may be substantially $-\vec{y}-\vec{z}$, a sixth polarization direction of the sixth antenna element 660 may be substantially $-\vec{y}+\vec{z}$, a seventh polarization direction of the seventh antenna element 670 may be substantially $\vec{y}+\vec{z}$, and an eighth polarization direction of the eighth antenna element 680 may be substantially $\vec{y}-\vec{z}$. Thus, any two adjacent, antenna elements have an angle of 45 or 135 degrees formed between their polarization directions, and the interference between them is suppressed.

In alternative embodiments, the first antenna element 610, the second antenna element 620, the third antenna element 630, the fourth antenna element 640, the seventh antenna element 670, and the eighth antenna element 680 are all linearly-polarized, and the fifth antenna element 650 and the sixth antenna element 660 are both circularly-polarized. Specifically, a first polarization direction of the first antenna element 610 may be substantially $\vec{z}$, a second polarization direction of the second antenna element 620 may be substantially $\vec{y}$, a third polarization direction of the third antenna element 630 may be substantially $-\vec{z}$, and a fourth polarization direction of the fourth antenna element 640 may be substantially $-\vec{y}$, a fifth polarization direction of the fifth antenna element 650 may be substantially RHCP (e.g., $\vec{y}-j\cdot\vec{z}$), a sixth polarization direction of the sixth antenna element 560 may be substantially LHCP (e.g., $\vec{y}+j\cdot\vec{z}$), a seventh polarization direction of the seventh antenna element 670 may be substantially $\vec{y}+\vec{z}$, and an eighth polarization direction of the eighth antenna element 680 may be substantially $\vec{y}-\vec{z}$. Thus, any two adjacent antenna elements either have different types of polarization or have an angle of 45 or 135 degrees formed between their polarization directions, and the interference between them is suppressed.

In other embodiments, the first antenna element 610, the second antenna element 620, the third antenna element 630 the fourth antenna element 640, the fifth antenna element 650, and the sixth antenna element 660 are all linearly-polarized, and the seventh antenna element 670 and the eighth antenna element 680 are both circularly-polarized. Specifically, a first polarization direction of the first antenna element 610 may be substantially $\vec{z}$, a second polarization direction of the second antenna element 620 may be substantially $\vec{y}$, a third polarization direction of the third antenna element 630 may be substantially $-\vec{z}$, and a fourth polarization direction of the fourth antenna element 640 may be substantially $-\vec{y}$, a fifth polarization direction of the fifth antenna element 650 may be substantially $\vec{y}+\vec{z}$, a sixth polarization direction of the sixth antenna element 660 may be substantially $\vec{y}-\vec{z}$, a seventh polarization direction of the seventh antenna element 670 may be substantially RHCP (e.g., $\vec{y}-j\cdot\vec{z}$), and an eighth polarization direction of the eighth antenna element 680 may be substantially LHCP (e.g., $\vec{y}+j\cdot\vec{z}$). Thus, any two adjacent antenna elements either have different types of polarization or have an angle of 45 or 135 degrees formed between their polarization directions, and the interference between them is suppressed.

Generally, any adjacent two of the first antenna element 610, the second antenna element 620, the third antenna element 630, the fourth antenna element 640, the fifth antenna element 650, the sixth antenna element 660, the seventh antenna element 670, and the eighth antenna element 680 have different polarization directions. According to practical measurements, such a design can effectively enhance the isolation between antenna elements, thereby significantly improving the communication quality of the communication device 600.

The invention proposed a novel communication device. In comparison to the conventional design, the invention has at least the following advantages of: (1) covering a relatively wide band, (2) providing multiple polarization directions, (3) generating an almost omnidirectional radiation pattern, (4) effectively reducing the whole antenna size, (5) increasing isolation between antenna elements, (6) having a simple structure for mass production, and (7) reducing the whole manufacturing cost. Therefore, the invention is suitable for application in a variety of wireless access points.

Note that the above element sizes, element shapes, and frequency ranges are not limitations of the invention. An antenna designer can fine-tune these settings or values according to different requirements. It should be understood that the communication device of the invention is not limited to the configurations of FIGS. 1-10. The invention may include any one or more features of any one or more embodiments of FIGS. 1-10. In other words, not all of the features displayed in the figures should be implemented in the communication device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A communication device, comprising:
   a display device;
   a first antenna element;
   a second antenna element;
   a third antenna element;
   a fourth antenna element, wherein the display device is surrounded by a combination of the first antenna element, the second antenna element, the third antenna element, and the fourth antenna element; and
   a housing, wherein the housing is made of a nonconductive material;
   wherein any adjacent two of the first antenna element, the second antenna element, the third antenna element, and the fourth antenna element have different polarization directions.

2. The communication device as claimed in claim 1, wherein the combination of the first antenna element, the second antenna element, the third antenna element, and the fourth antenna element substantially has a first closed-loop shape.

3. The communication device as claimed in claim 1, wherein the display device is embedded in the housing.

4. The communication device as claimed in claim 3, wherein the first antenna element, the second antenna element, the third antenna element, and the fourth antenna element adhere to the housing.

5. The communication device as claimed in claim 3, wherein the first antenna element is adjacent to a right side of the housing, the second antenna element is adjacent to a bottom side of housing, the third antenna element is adjacent to a left side of the housing, and the fourth antenna element is adjacent to a top side of the housing.

6. The communication device as claimed in claim 1, wherein the first antenna element, the second antenna element, the third antenna element, and the fourth antenna element are linearly-polarized.

7. The communication device as claimed in claim 6, wherein a first polarization direction of the first antenna element is substantially $\vec{z}$, a second polarization direction of the second antenna element is substantially $\vec{y}$, a third polarization direction of the third antenna element is substantially $-\vec{z}$, and a fourth polarization direction of the fourth antenna element is substantially $-\vec{y}$.

8. The communication device as claimed in claim 1, wherein the first antenna element and the third antenna element are linearly-polarized, and the second antenna element and the fourth antenna element are circularly-polarized.

9. The communication device as claimed in claim 8, wherein a first polarization direction of the first antenna element is substantially $\vec{z}$, a second polarization direction of the second antenna element is substantially RHCP (Right Hand Circular Polarization), a third polarization direction of the third antenna element is substantially $-\vec{z}$, and a fourth polarization direction of the fourth antenna element is substantially LHCP (Left Hand Circular Polarization).

10. The communication device as claimed in claim 1, wherein the first antenna element and the third antenna element are circularly-polarized, and the second antenna element and the fourth antenna element are linearly-polarized.

11. The communication device as claimed in claim 10, wherein a first polarization direction of the first antenna element is substantially RHCP (Right Hand Circular Polarization), a second polarization direction of the second antenna element is substantially $\vec{y}$, a third polarization direction of the third antenna element is substantially LHCP (Left Hand Circular Polarization), and a fourth polarization direction of the fourth antenna element is substantially $-\vec{y}$.

12. The communication device as claimed in claim 1, further comprising:
   a fifth antenna element;
   a sixth antenna element;
   a seventh antenna element; and
   an eighth antenna element, wherein the display device is surrounded by a combination of the first antenna element, the second antenna element, the third antenna element, the fourth antenna element, the fifth antenna element, the sixth antenna element, the seventh antenna element, and the eighth antenna element;
   wherein any adjacent two of the first antenna element, the second antenna element, the third antenna element, the fourth antenna element, the fifth antenna element, the sixth antenna element, the seventh antenna element, and the eighth antenna element have different polarization directions.

13. The communication device as claimed in claim 12, wherein the combination of the first antenna element, the second antenna element, the third antenna element, the fourth antenna element, the fifth antenna element, the sixth antenna element, the seventh antenna element, and the eighth antenna element substantially has a second closed-loop shape.

14. The communication device as claimed in claim 12, wherein the fifth antenna element, the sixth antenna element, the seventh antenna element, and the eighth antenna element adhere to the housing.

15. The communication device as claimed in claim 12, wherein the fifth antenna element is adjacent to a bottom right corner of the housing, the sixth antenna element is adjacent to a bottom left corner of housing, the seventh antenna element is adjacent to a top left corner of the housing, and the eighth antenna element is adjacent to a top right corner of the housing.

16. The communication device as claimed in claim 12, wherein the first antenna element, the second antenna element, the third antenna element, the fourth antenna element, the fifth antenna element, the sixth antenna element, the seventh antenna element, and the eighth antenna element are linearly-polarized.

17. The communication device as claimed in claim 16, wherein a first polarization direction of the first antenna element is substantially $\vec{z}$, a second polarization direction of the second antenna element is substantially $\vec{y}$, a third polarization direction of the third antenna element is substantially $-\vec{z}$, and a fourth polarization direction of the fourth antenna element is substantially $-\vec{y}$, a fifth polarization direction of the fifth antenna element is substantially $-\vec{y}-\vec{z}$, a sixth polarization direction of the sixth antenna element is substantially $-\vec{y}+\vec{z}$, a seventh polarization direction of the seventh antenna element is substantially $\vec{y}+\vec{z}$, and an eighth polarization direction of the eighth antenna element is substantially $\vec{y}-\vec{z}$.

18. The communication device as claimed in claim 12, wherein the first antenna element, the second antenna element, the third antenna element, the fourth antenna element, the seventh antenna element, and the eighth antenna element are linearly-polarized, and the fifth antenna element and the sixth antenna element are circularly-polarized.

19. The communication device as claimed in claim 18, wherein a first polarization direction of the first antenna element is substantially $\vec{z}$, a second polarization direction of the second antenna element is substantially $\vec{y}$, a third polarization direction of the third antenna element is substantially $-\vec{z}$, and a fourth polarization direction of the fourth antenna element is substantially $-\vec{y}$, a fifth polarization direction of the fifth antenna element is substantially RHCP (Right Hand Circular Polarization), a sixth polarization direction of the sixth antenna element is substantially LHCP (Left Hand Circular Polarization), a seventh polarization direction of the seventh antenna element is substantially $\vec{y}+\vec{z}$, and an eighth polarization direction of the eighth antenna element is substantially $\vec{y}-\vec{z}$.

* * * * *